(12) United States Patent
Morelock et al.

(10) Patent No.: US 6,772,149 B1
(45) Date of Patent: Aug. 3, 2004

(54) SYSTEM AND METHOD FOR IDENTIFYING FACTS AND LEGAL DISCUSSION IN COURT CASE LAW DOCUMENTS

(75) Inventors: John T. Morelock, Beavercreek, OH (US); James S. Wiltshire, Jr., Springboro, OH (US); Salahuddin Ahmed, Miamisburg, OH (US); Timothy Lee Humphrey, Kettering, OH (US); Xin Allan Lu, Springboro, OH (US)

(73) Assignee: Lexis-Nexis Group, Miamisburg, OH (US)

( * ) Notice: Subject to any disclaimer, the term of this patent is extended or adjusted under 35 U.S.C. 154(b) by 0 days.

(21) Appl. No.: 09/401,725

(22) Filed: Sep. 23, 1999

(51) Int. Cl.[7] .............................................. G06F 17/30
(52) U.S. Cl. ....................... 707/6; 707/7; 704/9; 704/1; 706/12; 706/16; 706/45; 715/500; 715/531; 715/535
(58) Field of Search .......................... 707/1–10; 706/12, 706/45–50; 704/9, 1; 715/500, 531, 535

(56) References Cited

U.S. PATENT DOCUMENTS 5,265,065 A * 11/1993 Turtle ............................ 707/4
5,418,948 A     5/1995 Turtle (List continued on next page.)

OTHER PUBLICATIONS

"Expert Systems in Case–Based Law: The Hearsay Rule Advisor"—Marilyn T. MacCrimmon— ACM —089791–322–1/89/0600/0068( (pps: 68–73) .*

"Finding Factors: Learning to Classify Case Opinions under Abstract Fact Categories"—Stefanie Bruninghaus and Kevin D. Ashley —1997 (pps: 123–131).*

(List continued on next page.)

*Primary Examiner*—Jean M. Corrielus
*Assistant Examiner*—Anh Ly
(74) *Attorney, Agent, or Firm*—Jacobson Holman PLLC

(57) ABSTRACT

A computer-implemented method of gathering large quantities of training data from case law documents (especially suitable for use as input to a learning algorithm that is used in a subsequent process of recognizing and distinguishing fact passages and discussion passages in additional case law documents) has steps of: partitioning text in the documents by headings in the documents, comparing the headings in the documents to fact headings in a fact heading list and to discussion headings in a discussion heading list, filtering from the documents the headings and text that is associated with the headings, and storing (on persistent storage in a manner adapted for input into the learning algorithm) fact training data and discussion training data that are based on the filtered headings and the associated text. Another method (of extracting features that are independent of specific machine learning algorithms needed to accurately classify case law text passages as fact passages or as discussion passages) has steps of: determining a relative position of the text passages in an opinion segment in the case law text, parsing the text passages into text chunks, comparing the text chunks to predetermined feature entities for possible matched feature entities, and associating the relative position and matched feature entities with the text passages for use by one of the learning algorithms. Corresponding apparatus and computer-readable memories are also provided.

14 Claims, 6 Drawing Sheets

U.S. PATENT DOCUMENTS

| | | | |
|---|---|---|---|
| 5,488,725 A | | 1/1996 | Turtle et al. |
| 5,544,352 A | | 8/1996 | Egger |
| 5,720,003 A | * | 2/1998 | Chiang et al. ............... 706/21 |
| 5,771,378 A | | 6/1998 | Holt et al. |
| 5,819,248 A | * | 10/1998 | Kegan ...................... 706/45 |
| 5,819,260 A | * | 10/1998 | Lu et al. ..................... 707/3 |
| 5,832,494 A | | 11/1998 | Egger et al. |
| 5,850,490 A | * | 12/1998 | Johnson .................... 715/530 |
| 5,918,240 A | * | 6/1999 | Kupiec et al. ............. 715/531 |
| 6,055,531 A | * | 4/2000 | Bennett et al. ............... 707/5 |
| 6,167,369 A | * | 12/2000 | Schulze ........................ 704/9 |
| 6,192,360 B1 | * | 2/2001 | Dumais et al. ............... 707/6 |
| 6,226,620 B1 | * | 5/2001 | Oon ............................. 705/2 |
| 6,289,342 B1 | * | 9/2001 | Lawrence et al. ........... 707/7 |
| 6,311,176 B1 | * | 10/2001 | Steiner ...................... 706/45 |
| 6,502,081 B1 | * | 12/2002 | Wiltshire et al. ........... 706/12 |

OTHER PUBLICATIONS

Daniels, J. J. & Rissland, E. L., "Finding legally relevant passage in case opinions." *Proceedings of 6th International Conference on AI and Law*, Melbourne, pp. 39–46, 1997.

Dick, J., "Conceptual retrieval and case law," *Proceedings of 1st International Conference on AI and Law*, Boston, pp. 106–115, 1987.

Meldman, J. A., "A structural model for computer–aided legal analysis", *Rutgers Journal of Computers and the Law*, vol. 6, pp. 27–71, 1977.

Hafner, C. D., "Conceptual organization of caselaw knowledge base," *Proceedings of 1st International Conference on AI and Law*, Boston, pp. 35–42, 1987.

Moens, M. F. et al., "Abstracting of legal cases: The SALOMON experience," *Proceedings of 6th International Conference on AI and Law*, Melbourne, pp. 114–122, 1997.

Nitta, K. et al., "New HELIC–II: A software tool for legal reasoning," *Proceedings of 5th International Conference on AI and Law*, College Park, MD, pp. 287–296, 1995.

Pannu, A. S., "Using genetic algorithms to inductively reason with cases in the legal domain," *Proceedings of 5th International Conference on AI and Law*, College Park, MD, pp. 175–184, 1995.

Rissland, E. L. & Ashley, K. D., "A case–based system for trade secrets law," *Proceedings of 1st International Conference on AI and Law*, Boston, pp. 60–66, 1987.

Rissland, E. L. et al., "BankXX: A program to generate argument through case–based search," *Proceedings of 4th International Conference on AI and Law*, Amsterdam, pp. 117–124, 1993.

Rissland, E. L. & Daniels, J. J., "A hybrid CBR–IR approach to legal information retrieval," *Proceedings of 5th International Conference on AI and Law*, College Park, MD, pp. 52–61, 1995.

Smith, J. C. and Gelbart, D., "FLEXICON: An evolution of a statistical ranking model adopted for intelligent legal text management," *Proceedings of The 4th International Conference on Artificial Intelligence and Law*, Amsterdam, pp. 142–151, 1993.

Smith, J. C., "The use of lexicons in information retrieval in legal databases," *Proceedings of The 6th International Conference on Artificial Intelligence and Law*, Melbourne, pp. 29–38, 1997.

Tyree, A. L., "Fact content analysis of caselaw: methods and limitations," *Jurimetrics Journal*, Fall 1981, pp. 1–33, 1981.

\* cited by examiner

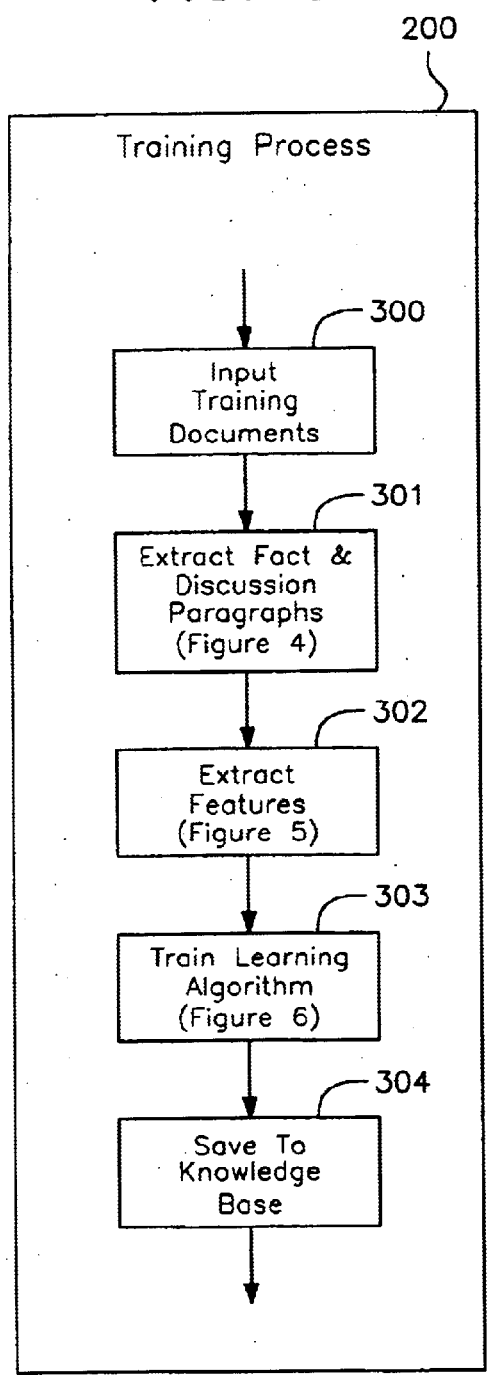
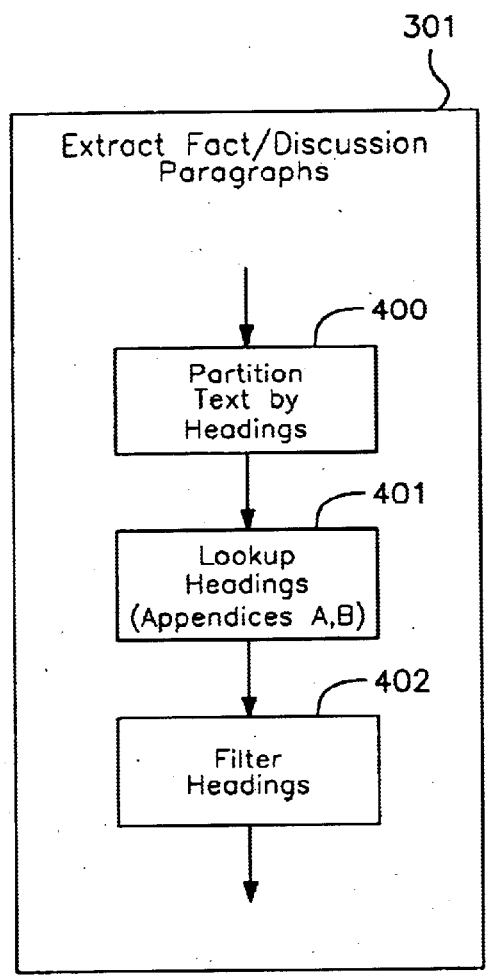

SYSTEM AND METHOD FOR IDENTIFYING FACTS AND LEGAL DISCUSSION IN COURT CASE LAW DOCUMENTS

COPYRIGHT NOTICE: A portion of the disclosure (including all Appendices) of this patent document contains material that is subject to copyright protection. The copyright owner has no objection to the facsimile reproduction by anyone of the patent document or the patent disclosure as it appears in the U.S. Patent and Trademark Office patent file or records, but the copyright owner reserves all other copyright rights whatsoever.

BACKGROUND OF THE INVENTION

1. Field of the Invention

The present invention relates to computer-assisted legal research (CALR). More specifically, the invention relates to systems and methods that identify and distinguish facts and legal discussion in the text of court opinions.

2. Related Art

Few patents and a very limited body of research literature are devoted to analysis and indexing of court decisions and case law. One reason for this phenomenon may be that the complexity of the current body of legal data overwhelms computing applications. Some applications, including artificial intelligence applications, were too ambitious and failed to follow the scientific approach of "divide and conquer": decompose a large problem into smaller ones and tackle the smaller and easier problems one at a time.

The present invention is directed to a computing method to address one of these smaller problems: identifying and distinguishing the facts and the legal discussion in a court's legal opinion. This invention is fundamental to the improvement of the future CALR.

Factual analysis is the very first task in legal research process. A thorough analysis of facts leads to a solid formulation of legal issues to be researched. Facts are the dynamic side of law, in contrast to the relatively stable authoritative legal doctrines.

Most legal research and controversy concerns facts, not law—cases are most often distinguished on the facts. The rules stated by courts are tied to specific fact situations and cannot be considered independently of the facts. The rules must be examined in relation to the facts. In this sense, the facts of a legal issue control the direction of CALR.

Applicants are aware of no patent related to distinguishing fact from legal discussion in case law documents. Most of the patents that are at all related to legal documents are in the field of information retrieval, and these patents generally do not include differentiation of facts from legal discussions in their indexing of the documents (see U.S. Pat. Nos. 5,544,352; 5,771,378; 5,832,494). Some of the patents emphasize the usage of legal concepts, not facts, in the form of headnotes, classification codes, and legal lexicons (see U.S. Pat. Nos. 5,265,065; 5,418,948; 5,488,725).

In research literature, the FLAIR project (Smith 93 and 97) attempted to separate legal content from fact, but focused heavily on legal concepts. In FLAIR, a legal lexicon is carefully constructed manually by legal experts. In this lexicon, legal concept terms are hierarchically organized by their conceptual relationships, and synonyms and alternative word forms for each lexicon term are included for completeness. FLAIR defines facts as follows: "Fact words are every words in the database other than concepts, statute citations, cited cases, and noise words. Fact phrases are fact words that appear next to each other with or without noise words in between." In other words, there is no specific process that specializes in identifying the facts themselves—facts are merely derivatives of look-ups from the concept lexicon. Also, FLAIR's notion of fact includes only words and phrases, and does not provide for entire passages in a court decision.

A few other research projects share the lexicon approach adopted in FLAIR, now referred to as "conceptual legal information retrieval" (Hafner 87; Bing 87; Dick 87). These research techniques are generally domain-specific, small-scale applications.

Some research techniques that do process facts apply case-based reasoning (CBR) technologies to legal data (Rissland 87, 93, 95; Daniels 97; Ashley 90). CBR represents a branch of artificial intelligence research and emphasizes knowledge acquisition and knowledge representation using a device known as a "case frame", or "frame". To populate their "frames", the CBR researchers analyze sample case law documents to extract, condense, and categorize facts and other relevant information into pre-defined frames. The quality of the extraction of facts, then, is limited to the quality of the design of the frames themselves; a fact that is important in one CBR frame is not necessarily important in another. This manual extraction and processing is neither repeatable nor scalable—a CBR project usually employs only a few dozen to a couple of hundred case law documents on a very narrow legal subject, like personal bankruptcy or contributory negligence.

A broader approach than CBR is the application of artificial intelligence (AI) to legal reasoning. In any of these computerized AI applications, facts, as in the CBR applications, play a crucial role in automatic inference. In the earlier research, the assumption is that facts are already available to help legal reasoning (Meldman 77; Tyree 81). The same assumption is made in the theoretical works (Levi 42; Gardner 87; Alexy 89; Rissland 90). How these facts are obtained was not the concern in these works. After about 1980, some researchers started creating small fact data banks for their experiments in order to build empirical evidence of effectiveness of their proposed models (Nitta 95; Pannu 95). But their approach to gathering facts from court decisions was ad hoc, and has no real potential for processing millions of decisions found in modern commercial legal databases.

A relevant research work is the SALOMON project in Belgium (Moens 97). SALOMON performs detailed analysis on criminal case decisions to programmatically identify the semantic text segments and summarize the contents within each segment. A Belgian criminal case is typically made up of nine logic segments: the superscription with the name of the court and date, identification of the victim, identification of the accused, alleged offences, transition formulation, opinion of the court, legal foundations, verdict, and conclusion. SALOMON focuses on identifying three of these nine segments: alleged offences, opinion, and legal foundations. The locating of alleged offences in a Belgian criminal case is roughly equivalent to the locating of the facts, a focus of the present invention.

SALOMON's identification of these three segments in a decision relies on "word patterns" and the sequence of the segments. For example, the legal foundation segment follows an opinion segment, and might be introduced with the word pattern "On these grounds." It is unclear in the reported study, how many of the word patterns are employed in analysis and how the patterns are generated. It seems that the patterns are created manually, specific to the Belgian criminal cases. This approach is not too dissimilar from the lexicon approach used in FLAIR.

In addition, SALOMON assumes that only the text units, such as paragraphs, that appear in an alleged offense segment are related to the facts in the case. In reality, facts can appear in any part of a court decision. Even when there is a section devoted to facts, as in many U.S. and U.K. criminal cases, the facts are also embedded in the reasoning, arguments, and ruling, throughout the opinion. SALOMON makes no attempt to recognize these scattered "applied" facts. In fact, it eliminates them during its summarization process after the structure of a court decision is determined through the word pattern analysis.

The process of summarization in SALOMON consists of consolidating important content texts in each of the three determined segments. It is realized through a clustering analysis of the paragraphs in one segment, and extracting the important keywords from a few large clusters because they represent important topics in the case, based on the assumption of repetitive human usage of words. The condensed texts and the extracted keywords serve as the final summary.

To summarize, Applicants are not aware of known systems that perform legal document analysis in the manner done by the present invention. Research literature discloses methods of gathering facts from court decisions, but can not be adequately scaled to handle substantial engineering applications. It is to meet these demands, among others, that the present invention is directed.

References Discussed Above

Alexy, R., *A Theory of Legal Argumentation*. Clarendon Press, Oxford, 1989.
Ashley, K. D., *Modeling legal Argument: Reasoning with Cases and Hypotheticals*, MIT Press, Cambridge, Mass., 1990.
Bing, J., "Designing text retrieval systems for 'conceptual search,'" *Proceedings of 1st International Conference on AI and Law*, Boston, pp.43–51, 1987.
Daniels, J. J. & Rissland, E. L., "Finding legally relevant passage in case opinions." *Proceedings of 6th International Conference on AI and Law*, Melbourne, pp.39–46, 1997.
Dick, J., "Conceptual retrieval and case law," *Proceedings of 1st International Conference on AI and Law*, Boston, pp.106–115, 1987.
Gardner, A. L., *An Artificial Intelligence Approach to Legal Reasoning*, MIT Press, 1987.
Hafner, C. D., "Conceptual organization of caselaw knowledge base," *Proceedings of 1st International Conference on AI and Law*, Boston, pp. 35–42, 1987.
Levi, E. H., *An Introduction to Legal Reasoning*, University of Chicago Press, 1941.
Meldman, J. A., "A structural model for computer-aided legal analysis", *Rutgers Journal of Computers and the Law*, Vol.6, pp.27–71, 1977.
Moens, M. F. et al., "Abstracting of legal cases: The SALOMON experience," *Proceedings of 6th International Conference on AI and Law*, Melbourne, pp.114–122, 1997.
Nitta, K. et al., "New HELIC-II: A software tool for legal reasoning," *Proceedings of 5th International Conference on AI and Law*, College Park, Md., pp.287–296, 1995.
Pannu, A. S., "Using genetic algorithms to inductively reason with cases in the legal domain," *Proceedings of 5th International Conference on AI and Law*, College Park, Md., pp.175–184, 1995.
Rissland, E. L. & Ashley, K. D., "A case-based system for trade secrets law," *Proceedings of 1st International Conference on AI and Law*, Boston, pp.60–66, 1987.
Rissland, E. L., "Artificial intelligence and law: stepping stones to a model of legal reasoning," *Yale Law Review*, Vol.99, pp.1957–1981, 1990.
Rissland, E. L. et al., "BankXX: A program to generate argument through case-based search," *Proceedings of 4th International Conference on AI and Law*, Amsterdam, pp. 117–124, 1993.
Rissland, E. L. &.Daniels, J. J., "A hybrid CBR-IR approach to legal information retrieval," *Proceedings of 5th International Conference on AI and Law*, College Park, Md., pp.52–61, 1995.
Smith, J. C. and Gelbart, D., "FLEXICON: An evolution of a statistical ranking model adopted for intelligent legal text management," *Proceedings of The 4th International Conference on Artificial Intelligence and Law*, Amsterdam, pp.142–151, 1993.
Smith, J. C., "The use of lexicons in information retrieval in legal databases," *Proceedings of The 6th International Conference on Artificial Intelligence and Law*, Melbourne, pp.29–38, 1997.
Tyree, A. L., "Fact content analysis of caselaw: methods and limitations," *Jurimetrics Journal*, Fall 1981, pp.1–33, 1981.
Hosmer, D. W.; Lemeshow, S., *Applied Logistic Regression*, Wiley & Sons, 1989.
Mitchell, T. M., *Machine Learning*, McGraw-Hill, p. 183, 1997.

SUMMARY OF THE INVENTION

The inventive system and method involve two processes: training a machine-based learning algorithm, and processing case law documents to identify and distinguish fact paragraphs and legal discussion paragraphs.

Two factors determine a successful analysis of case law document texts: the abstract learning "features" that facilitate machine learning, and the learning capacity of a selected learning algorithm given a set of these features. The invention provides such a set of features, and allows employment of any of a number of learning algorithms to successfully identify and distinguish fact and discussion.

In addition, a scaleable commercial application requires an automatic gathering of large quantity of training data from case law documents. The present invention provides a solution to this problem as well.

Thus, the invention provides a computer-implemented method of gathering large quantities of training data from case law documents, especially suitable for use as input to a learning algorithm that is used in a subsequent process of recognizing and distinguishing fact passages and discussion passages in additional case law documents. The method has steps of: partitioning text in the documents by headings in the documents, comparing the headings in the documents to fact headings in a fact heading list and to discussion headings in a discussion heading list, filtering from the documents the headings and text that is associated with the headings, and storing (on persistent storage in a manner adapted for input into the learning algorithm) fact training data and discussion training data that are based on the filtered headings and the associated text.

The invention further provides a method of extracting features that are independent of specific machine learning algorithms needed to accurately classify case law text passages as fact passages or as discussion passages. The method has steps of determining a relative position of the text passages in an opinion segment in the case law text, parsing the text passages into text chunks, comparing the text chunks to predetermined feature entities for possible matched feature entities, and associating the relative position and matched feature entities with the text passages for use by one of the learning algorithms.

The invention also provides apparatus for performing the methods, as well as computer-readable memories that (when used in conjunction with a computer) can carry out the methods.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3 is a high-level flow chart schematically illustrating an exemplary embodiment of training process 200 (FIG. 1).

FIG. 4 is a flow chart illustrating details of an exemplary step 301 (FIG. 3) in the training process, of extracting fact and discussion paragraphs by partitioning text using headings that denote fact and discussion sections.

DETAILED DESCRIPTION OF THE PREFERRED EMBODIMENTS

Figure 1:
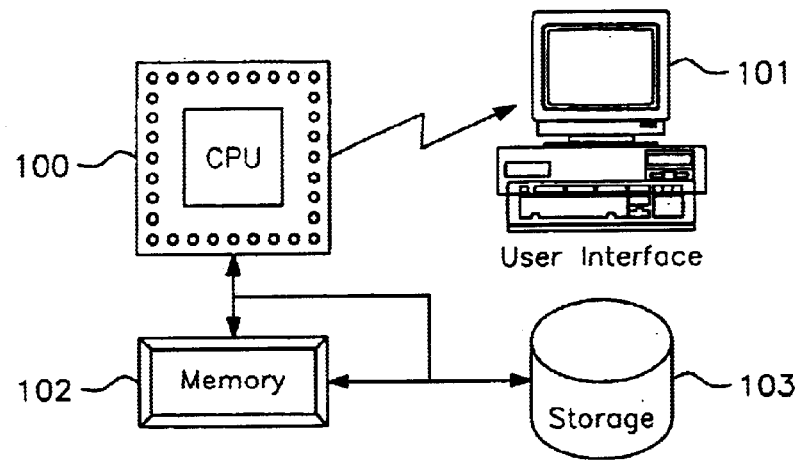
FIG. 1 illustrates an exemplary hardware configuration in which the invention may be implemented.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Background, Overview, Definition of Terms. The present invention uses one of various machine-based learning algorithms to recognize and distinguish fact texts and legal discussion texts in case law documents. The learning algorithms are first trained in a training process, before a recognition process operates on case law documents.

The training process involves presenting the learning algorithms with Training examples of fact texts and legal discussion texts, in the form of "features." As understood in this specification, "features" can be as simple as unique English words at a lexical level; or can be abstracted notions such as a legal concept, date or past tense verb at a conceptual level. Relevant features that can help distinguish facts from legal discussions are then stored in a knowledge base for use during the subsequent recognition process.

The invention is primarily concerned with gathering training data and converting it into an array of features discovered as being important for recognition of case law text as either containing facts or legal discussion. It is therefore a primary object of this invention to describe a computer-based method for performing the following:

1. Gathering fact and discussion training data from the opinion section of case law documents suitable for training the algorithms.
2. Transforming the gathered training data into the features needed by the algorithms to accurately distinguish fact and legal discussion text during the training and recognition processes.

The invention also provides a novel method of scoring, in which a passage can be classified as containing:

A. Fact,
B. Discussion,
C. Neither Fact nor Discussion, or
D. Both Fact and Discussion, based on scores generated by a learning process.

Any of various learning algorithms may be used in the recognition process, provided they effectively use the features derived from the training data. Logistical regression is one such machine-based learning algorithm presented and described with examples below. Other algorithms with a similar learning capacity can be used as well, such as the popular learning algorithm, Naïve Bayes, described as an alternative embodiment.

Without losing generality, "fact texts" can be defined as those fact paragraphs that describe the procedural history of a case or the narration of an incident.

Similarly, "discussion texts" can be defined as those discussion paragraphs that describe:

1) a rule—statement of law,
2) analysis—court's analysis of the facts as applied to the law, and
3) a holding—a decision of the court.

If necessary, both fact texts and legal discussion texts can be defined, for example, at is subparagraph (i.e., passage) level as well as at sentence level. For brevity, however, hereafter they will be referred to in this specification as "Fact Paragraphs" and "Discussion Paragraphs."

In order to gather training data, first a plurality of case law documents is parsed, and Fact and Discussion paragraphs are extracted from the opinion section. Then, a set of decisions is made:

A paragraph is considered "Fact" if the heading preceding it is a "fact heading" such as one of those listed in Appendix A (e.g., "Facts", "Background", "Underlying Facts").

A paragraph is considered "Discussion" if the heading preceding it is a "legal discussion heading" such as one of those listed in Appendix B (e.g. "Discussion", "Rule", "Issues").

Paragraphs following a heading that do not appear in the fact or discussion heading lists are ignored.

The separation of the training data into Fact and Discussion based on the headings within the opinion segment is one of the primary features of the invention. This separation is important for these reasons:

1) A large sample of data is necessary to create features that can best represent case law documents in one or more legal jurisdictions. The invention allows use of this large amount of sample data.
2) It is very costly to have legal analysts manually categorize paragraphs or sections of case law documents as containing Fact or Discussion. The invention avoids this cost.
3) The invention leverages the existing data as categorized by the judge who wrote the legal opinion.

This automatic process of gathering training data is subject to a small rate of error. For example, some paragraphs identified as fact paragraphs may in fact be legal discussion paragraphs. However, these errors are not problematic statistically to machine learning, when there is a significant amount of sample data.

The invention's task of creating "features" is based on a list of abstract items that greatly improve the performance of the learning algorithm in recognizing and distinguishing Fact and Discussion paragraphs. In a particular preferred embodiment these "features" include some or all of the following:

1) Position of the paragraph within the opinion
2) Case cites
3) Statute cites
4) Past-tense verbs
5) Dates
6) Signal words
7) This court
8) Lower court
9) References to the defendant
10) References to the plaintiff
11) Legal phrases The creation of these features from the extracted fact and discussion paragraphs is probably best understood with an example. The following is a Fact paragraph taken from a case law document:

By letter dated Dec. 15, 1975, plaintiff requested of the served defendants, including respondents, a written stipulation extending for six months the five-year deadline for commencement of trial herein from Jun. 21, 1976, in the event the deadline applied. Respondents never granted this request and no written stipulation extending the Jun. 21, 1976, deadline was ever either executed or filed.

From this paragraph, the feature parameters are populated with simple counts of the occurrences of each abstracted feature:

1) Relative paragraph position=0.46 (sixth paragraph of 13 total in opinion)
2) Number of case cites=0
3) Number of statue cites=0
4) Number of past-tense verbs=7 ("dated", "requested", "served", "applied", "granted", "executed" and "filed")
5) Number of dates=3 ("Dec. 15, 1975" and "Jun. 21, 1976" twice)
6) Number of signal words=0
7) Number of this court references=0
8) Number of lower court references=0
9) Number of defendant words=3 ("defendants" and "respondents" twice)
10) Number of plaintiff words=1 ("plaintiff")
11) Number of legal phrases=0

Of course, the particular choice, the precise number, and the exact usage of these features relative to the learning algorithms, are not critical to a particular learning algorithms.

One embodiment of the invention involves a machine learning algorithm based on logistical regression. The logistical regression algorithm utilizes predictions from a linear regression equation of the factors (here, the "features") to specify the probability that a given paragraph is Fact or Discussion. The linear regression equation is built during the learning or training process from a linear modeling of the factors found in the Fact and Discussion training paragraphs.

Specifically, the following linear model is built using training data:

$$Y = b_0 + b_1 * F_1 + \ldots + b_{11} * F_{11}$$

in which:

Y $Y = \text{logit}(p)$, the logit transformation of the probability p (p being a probability whether a given paragraph is a fact or is a discussion), $F_1 - F_{11}$ correspond to the listed features (in this example, 11 features), and $b_0 - b_{11}$ are linear coefficients determined during training.

During training for recognizing facts or for recognizing discussions, thousands of positive as well Was negative sample paragraphs in the form of a numeric feature list are fed to the regression model so that the coefficients, b0 through b11, can be derived from the inputs. Following are two lines of an exemplary numeric feature list, with the first column designating positive or negative training paragraph and the remaining columns the eleven features in their numeric format:

1 0.12 00 00 08 01 00 00 01 00 00 01 0 0.55 00 00 01 00 00 00 01 00 00 00

In a particular exemplary embodiment, logistical regression relies solely on the features described above. Terms that are not extracted as a feature are essentially ignored. This technique can achieve accuracy in the low 90% range, demonstrating the importance of the features that are selected.

After the training process is completed, the twelve coefficients have been determined from the sample training paragraphs, and the thus-built logistical model is ready for the recognition process, a process of identifying fact and discussion paragraphs in the case law documents. The recognition process is different from the training process in that the input feature list has a null value in its first column, which the model computes based on the coefficients and the feature numericals of a paragraph being processed.

The logistical regression algorithm typically generates a single score that represents the probability that the paragraph is either Fact or Discussion. An exemplary embodiment of the invention utilizes two probability scores from the learning algorithm, one each for Fact and Discussion. These scores are then compared to determine if the paragraph is Fact, Discussion, neither Fact nor Discussion, or both Fact and Discussion.

To generate these two scores using logistical regression, two sets of training data are created. The first training data set uses Fact Paragraphs as positive training examples and Discussion Paragraphs as negative training examples. The second training data set uses Discussion Paragraphs as positive training examples and Fact Paragraphs as negative training examples. The logistical regression procedure is then used on both training sets to create two sets of coefficients. These coefficients are then used during the recognition process to generate the Fact and Discussion probability scores. A simple score comparison method is then used to identify the paragraph as Fact, Discussion, Neither or Both.

The method of comparing probability scores generated by a learning algorithm and for classifying a case law text passage as:

1) Fact,
2) Discussion,
3) Both fact and discussion, or
4) Neither fact nor discussion, may include the following steps:

a) comparing a predetermined threshold T both to fact probability scores F and discussion probability scores D that were determined by the learning algorithm for the passage; and
b) classifying the passage as:
   1) Fact, if F>T and D<=T;
   2) Discussion, if D>T and F<=T;
   3) Both, if F>=T and D>=T; and
   4) Neither, if F<T and D<T.

Both the training process and recognition process involve processing texts a single time. Therefore, both processes have a computational complexity of O(N), and machine learning time is negligible compared to text processing tasks in both processes. Therefore, a significant advantage of the inventive method is that it is linearly scalable computationally. This scalability supports the invention's ability to process large volumes of training information, and to incorporate the correspondingly large amount knowledge contained in that training information, thereby enhancing the intelligence of the recognition process in processing "live" data.

The inventive method is more easily understood with references to examples. The examples used herein primarily deal with recognizing or categorizing individual paragraphs of case law documents as either Fact or Discussion, but this should not limit the scope of the present invention. In fact, any size text unit (such as a word, phrase, sentence, passage, paragraph or an entire section of a case law document) can be categorized into Fact, Discussion, Both or Neither, and still remain within the contemplation of the invention.

Exemplary Hardware and Software Configuration. Embodiments of the inventive fact/discussion classifier may be implemented as a software program including a series of modules of code that is executable on a computer system.

As shown in FIG. 1, an exemplary hardware platform includes a central processing unit 100. The central processing unit 100 interacts with a human user through a user interface 101. The user interface is used for inputting information into the system and for interaction between the system and the human user. The user interface includes, for example, a video display, keyboard and mouse. A memory 102 provides storage for data and software programs that are executed by the central processing unit. Auxiliary memory 103, such as a hard disk drive or a tape drive, provides additional storage capacity and a means for storing and retrieving large batches of information.

All components shown in FIG. 1 may be of a type well known in the art. For example, the system may include a SUN® workstation including the execution platform SPARCsystem 10 and SUN OS Version 5.5.1, available from SUN MICROSYSTEMS of Sunnyvale, Calif. Of course, the system of the present invention may be implemented on any number of computer systems. Moreover, although the preferred embodiment uses the PERL language (for text parsing tasks) and C++ (for number crunching and database access tasks), any appropriate programming language may be used to implement the present invention.

Figure 2:
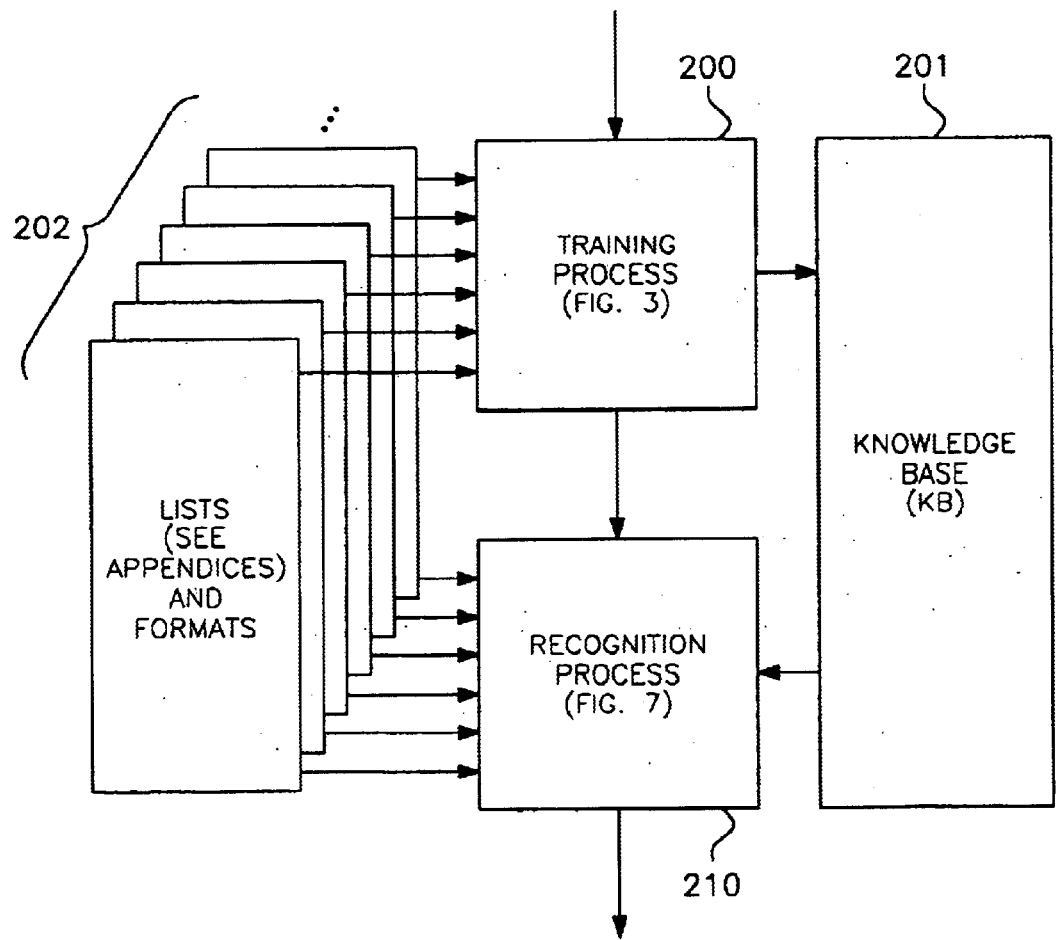
FIG. 2 is a high-level flow chart schematically illustrating the training process 200 and the recognition process 210 according to the invention.

Details of the Inventive Methods. FIG. 2 shows a high level process overview. The preferred embodiment of the invention includes two processes.

The learning algorithm is first trained (in training process 200) before it recognizes the distinction between Fact and Discussion paragraphs (in recognition process 210). A knowledge base 201 is utilized to store training results in the training process for use in the recognition process.

The training and recognition processes make use of a set of various lists and format definitions 202. The lists may include those exemplified in Appendix A through Appendix I at the end of this specification. The format definitions may include, for example, case cite formats, statute cite formats and date formats. Of course, the particular lists and format definitions chosen, as well as their content, may be varied while remaining within the contemplation of the invention.

Figure 7:
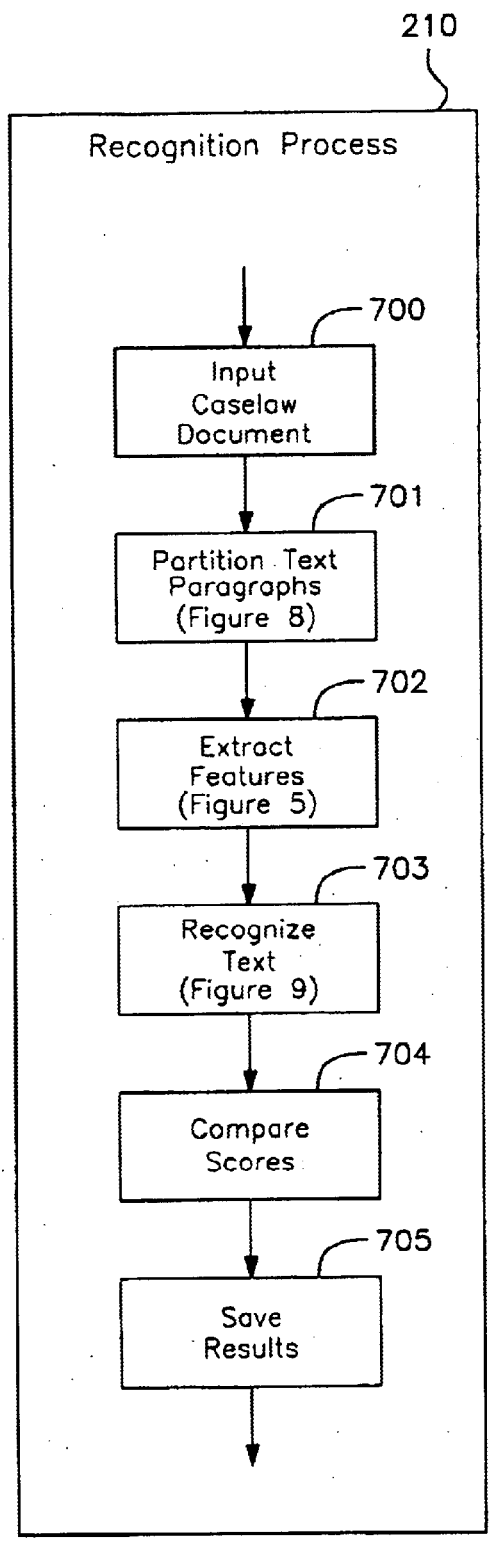
FIG. 7 is a high-level flow chart schematically illustrating an exemplary embodiment of recognition process 210 (FIG. 2).

The machine learning algorithm typically is first trained, as shown in FIG. 3, before it can categorize text of an unknown type, as shown in the recognition process of FIG. 7.

Referring to FIG. 3, in step 300 the opinion section of a plurality of case law documents is input. The opinion text is parsed in step 301 to extract paragraphs of text denoting Fact or Discussion. In step 302, "features" of each paragraph are then extracted and attached to the paragraph in a manner suitable to the particular learning algorithm being used. In step 303, these paragraphs are presented as training data to the learning algorithm, which learns based on the training data. Finally, in step 304 the results of the training step are stored in knowledge base 201 (FIG. 2).

Details of exemplary embodiments of training process steps 301, 302, and 303 (FIG. 3) are discussed with reference to FIGS. 4, 5, and 6, respectively.

The following describes an exemplary embodiment of the Extract Fact/Discussion step 301, with reference to FIG. 4. This step is an important feature of the invention.

Referring to FIG. 4, a step 400, Partitioning Text by Headings, involves the following. The opinion section of a case law document is parsed and partitioned by heading. The paragraphs that follow a heading up to, but not including, the next heading are saved in memory and indexed by heading text. While parsing, each paragraph is sequentially enumerated starting at zero (without regard to the headings) and a total count of paragraphs in the opinion is kept.

In step 401, Lookup Headings, the text of each heading is compared to Fact headings such as those listed in Appendix A and Discussion headings such as those listed in Appendix B. A flag is set indicating whether the heading is Fact, Discussion or neither.

In step 402, Filter Headings, any heading and associated paragraphs are discarded if they do not appear in fact or discussion lists, exemplified in Appendix A and Appendix B, respectively.

The following describes the Feature Extraction Module 302 used during training (as well as step 702 during recognition). Details of an exemplary embodiment of the Feature Extraction step are shown in FIG. 5.

In step 302, the "features" necessary to accurately categorize text as Fact or Discussion are extracted. This step 302 is an important aspect of the invention. The format of the feature, when associated with the paragraph, depends on the format required by the particular learning algorithm being used. Examples are given below for the logistical regression method and for the Naïve Bayes method. Features are listed in order of importance.

Referring again to FIG. 5, in the step 500 of extracting paragraph position, the relative position (P) of the paragraph is calculated by dividing the paragraphs enumeration (E) by the total number of paragraphs (T) found in the opinion. Symbolically, P=E/T. In Logistical Regression, (P) is saved as a floating-point number with the paragraph as the position parameter.

In the step 501 of extracting case cites, cites to other case law documents (such as "People v. Medina (1995) 39 Cal. App. 4th 643, 650") are extracted. In logistical regression, a count of the case cites in the paragraph is saved with the paragraph as the cite parameter.

In the step 502 of extracting statute cites, cites to state or federal statutes (such as "Code Civ. Proc., @ 657, subd. 2") are extracted. In logistical regression, a count of the statute cites in the paragraph is saved with the paragraph as the statute parameter.

In the step 503 of extracting past tense verbs, each word in the given paragraph is compared to words in a past tense verb list exemplified by Appendix C. Matching words are considered past tense verbs. In logistical regression, a count of the past tense verbs found is saved with the paragraph as the past tense verb parameter.

In the step 504 of extracting dates, dates such as "4 Jul. 1999", "November 98", "December 25th" are extracted. In logistical regression, a count of the dates found is saved with the paragraph as the date parameter.

In the step 505 of extracting signal words, each word in the given paragraph is compared to words in a signal word list exemplified by Appendix D. Matching words are considered issue words, and the appropriate information added to the paragraph. In logistical regression, a count of the holding words found is saved with the paragraph as the issue parameter.

In the step 506 of extracting This Court Phrases, phrases that refer to the court trying the case (such as "this court" or "this judge") are extracted as a feature. The paragraph is searched for "This Court" phrases as exemplified by Appendix E. In logistical regression, a count of the "This Court" phrases found is saved with the paragraph as the "This Court" parameter.

In the step 507 of extracting Lower Court Phrases, phrases that refer to a lower court such as "the trial court" or "the superior court" are extracted as a feature. The paragraph is searched for "Lower Court" phrases as exemplified by Appendix F. In logistical regression, a count of the "Lower Court" phrases found is saved with the paragraph as the "Lower Court" parameter.

In the step 508 of extracting Defendant Words, each word in the given paragraph is compared to the words in a defendant word list exemplified by Appendix G. Matching words are considered as references to the defendant. In logistical regression, a count of the "defendant" words found is saved with the paragraph as the defendant parameter.

In the step 509 of extracting Plaintiff Words, each word in the given paragraph is compared to the words in the plaintiff word list exemplified by Appendix H. Matching words are considered as references to the plaintiff. In logistical regression, a count of the "plaintiff" words found is saved with the paragraph as the plaintiff parameter.

In the step 510 of extracting Legal Phrases, legal phrases such as "criminal history", "custody dispute", "eminent domain" are extracted as a feature. The paragraph is searched for legal phrases as listed in Appendix I. In logistical regression, a count of the legal phrases found is saved with the paragraph as the legal phrase parameter.

Figure 5:
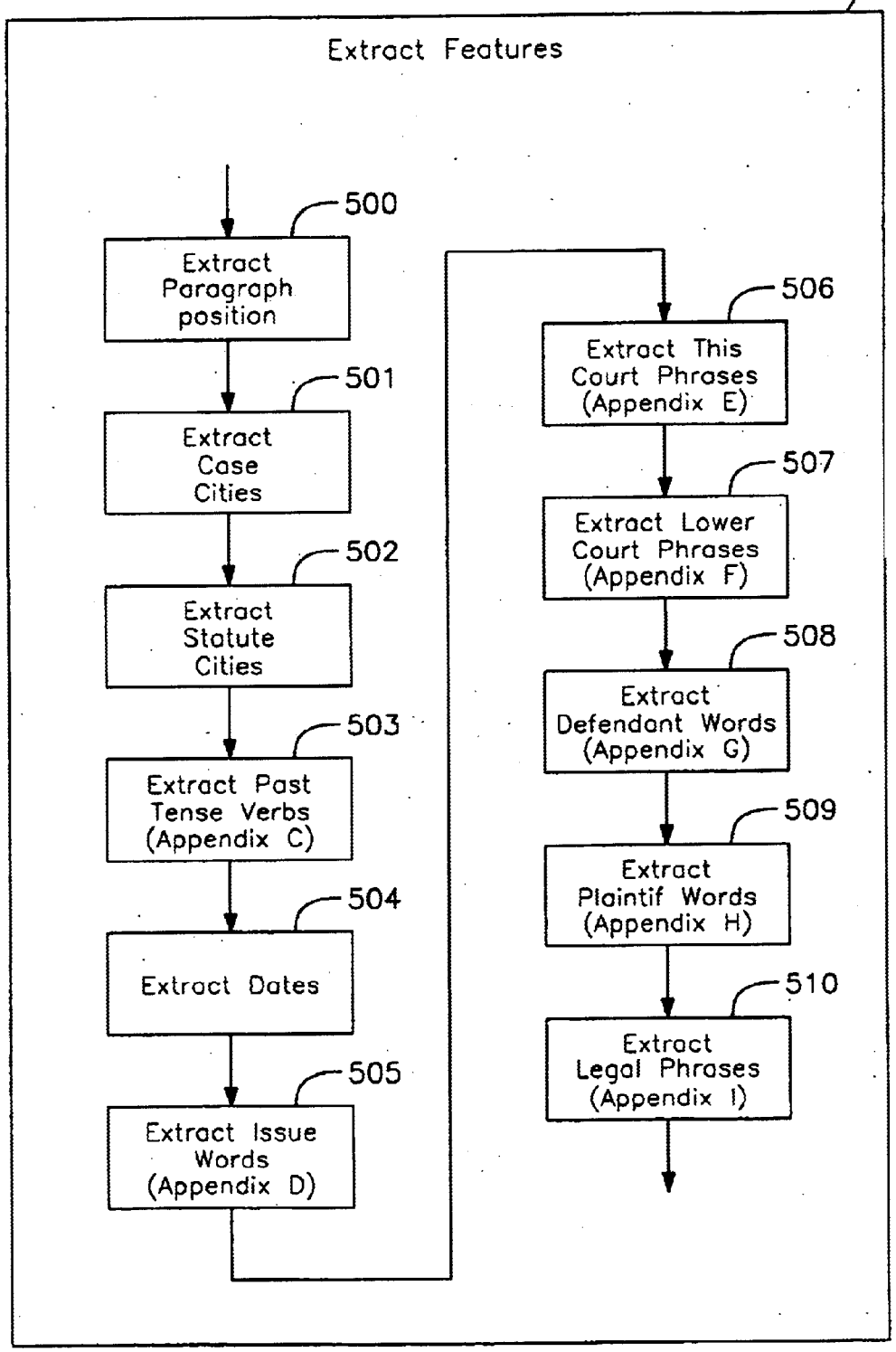
FIG. 5 is a flow chart illustrating details of an exemplary step 302 (FIG. 3) in the training process, or an exemplary step 702 (FIG. 7) in the recognition process, for the extraction of "features" from text of court opinions.

This completes discussion of the feature extraction step 302/702 (FIGS. 3, 7) and its many substeps shown in FIG. 5. Following is a discussion of the alternative embodiments of the Train Learning Algorithm step 303 (FIG. 3), for which reference is now made to FIG. 6.

Figure 6:
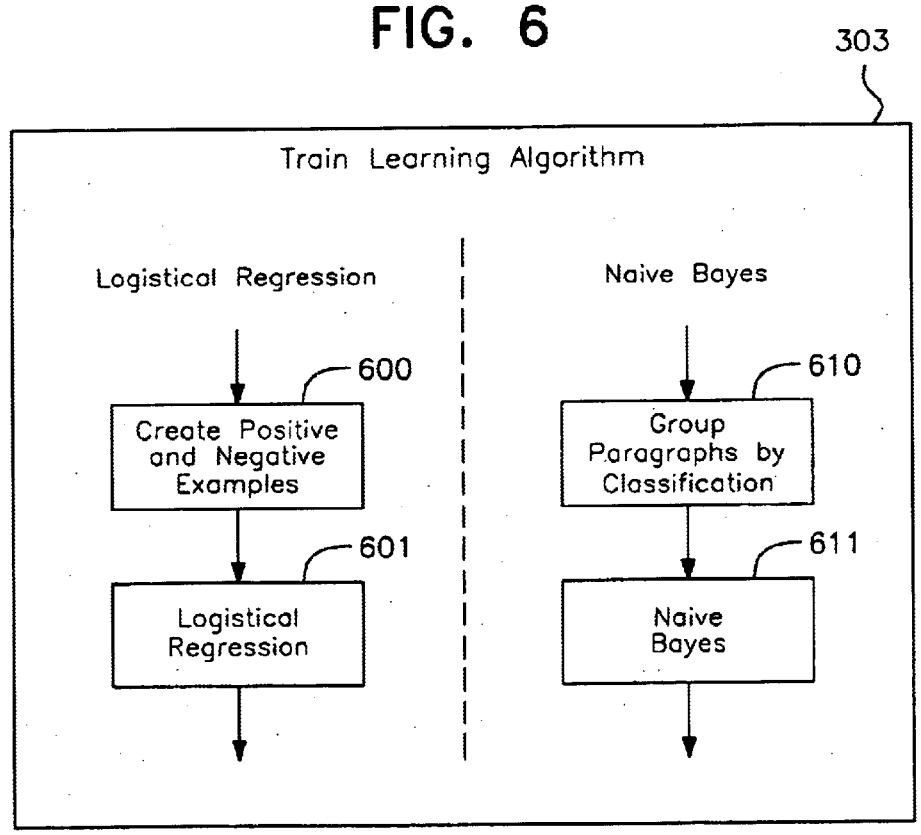
FIG. 6 is a flow chart illustrating alternative, exemplary embodiments of the train recognition step 303 (FIG. 3).

In the left half of FIG. 6, the logistical regression approach is illustrated. In the right half of FIG. 6, the Naïve Bayes approach is illustrated. First, the approach using logistical regression is discussed.

As is recognized by those skilled in the art, logistical regression is a procedure that utilizes a method of maximum likelihood to fit a linear logistic model to binary response variables. In the present case, the binary response variable is whether a paragraph is a Fact Paragraph or a Discussion Paragraph.

A linear logistical model assumes that, for each possible set of values for the independent (F) factors, there is a probability p that an event (success) occurs. The model assumes that Y is a linear combination of the values of the F factors ("features" in this application). Symbolically:

$$Y = b_0 + b_1{}^*F_1 + b_2{}^*F_2 + \ldots + b_k{}^*F_k$$

in which:

Y $Y = \text{logit}(p)$, the logit transformation of the probability "p"

$F_1$–$F_k$ correspond to the listed features, $b_0$–$b_k$ are linear coefficients, and k is an integer expressing the number of features.

Using these coefficients, the estimate logit of the probability "p" of an event (that is, Y or logit(p)) can be calculated. From Y, p can be derived from the formula:

$$p = \frac{e^Y}{(1+e^Y)}$$

The method of maximum likelihood is a general method of finding estimated (fitted) values of parameters.

The logistical regression algorithm is typically used to generate a single score that represents the probability that an event will occur. However, the preferred embodiment of this invention utilizes two scores, one score that represents the probability that the paragraph is Fact and another score that represents the probability that the paragraph is Discussion. To achieve this using Logistical Regression, two training sets are utilized to represent the Fact and Discussion categories. Although the preferred embodiment utilizes two scores, a single score can be utilized with equivalent results depending on the application. Of course, the scope of the present invention is of course not limited by the particular scoring technique that is used.

Training process 200 preferably involves a step 600 of creating positive and negative training examples for the Fact and Discussion training paragraphs. Each Fact paragraph is assigned a positive binary response variable of one (1), and each Discussion paragraph is assigned a negative binary response variable of zero (0). Conversely, for the Discussion training set, each Discussion paragraph is assigned a positive binary response variable of one (1), and each Fact paragraph is assigned a negative binary response variable of zero (0). The binary response variables, as well as the features of each paragraph, are then used as input into the logistical regression procedure (step 601) for each training set.

The choice of paragraphs to use for training is up to the user. The same training set can be used for both fact and discussion by simply inverting the dependent variable. Or, a different set of random samples can be chosen for each training set and assigned the appropriate dependent variable. The resulting accuracy should be equivalent regardless of which method is used.

This process is best explained with an example. 1 0.12 00 00 08 01 00 00 01 00 00 01 1 0.15 00 00 02 00 00 00 01 00 00 00 1 0.19 00 00 09 00 00 00 00 00 00 02 1 0.23 01 00 02 00 00 00 00 00 00 02 1 0.35 00 00 01 00 00 00 00 00 00

00 0 0.42 00 00 00 00 00 00 00 00 00 0 0.46 02 00 02 01 00 03 00 00 00 01 0 0.50 02 00 00 00 00 02 00 00 00 01 0 0.54 00 00 03 00 00 01 00 00 00 00 0 0.58 00 00 00 00 00 00 00 00 00

Each line above represents the parameters from a training paragraph created in the Extract Fact & Discussion Paragraphs step 301 and Extract Features step 302 (FIG. 3; details in FIGS. 4 and 5 respectively). The first five lines represent five Fact paragraphs and the last five lines represent five Discussion paragraphs. Each column of the above example is sequentially named from left to right as follows:

1) Binary Response Variable (1=Fact, 0=Discussion),
2) Paragraph Position,
3) Number of Case Cites,
4) Number of Statute Cites,
5) Number of Past Tense Verbs,
6) Number of Dates,
7) Number of Signal Words,
8) Number of This Court Phrases,
9) Number of Lower Court Phrases,
10) Number of Defendant Words,
11) Number of Plaintiff Words, and
12) Number of Legal Phrases.

This training data is then used as input into the logistical regression procedure (FIG. 6 step 601). The resulting output is a list of coefficients ($b_i$) that represent the weight that each factor (F) is multiplied by to produce (Y); coefficient $b_0$ is the intercept or bias coefficient, and isn't multiplied by a factor (F).

The following is an example (using illustrative "dummy" values) of the coefficients output from the logistical regression analysis:

| | | |
|---|---|---|
| $b_0 =$ | 3.0035 | "Intercept" or "Bias" coefficient |
| $b_1 =$ | −11.0259 | "Paragraph Position" coefficient |
| $b_2 =$ | −3.0035 | "Case Cites" coefficient |
| $b_3 =$ | −1.3270 | "Statute Cites" coefficient |
| $b_4 =$ | −0.1148 | "Past Tense Verbs" coefficient |
| $b_5 =$ | 0.1006 | "Dates" coefficient |
| $b_6 =$ | 0.4988 | "Signal Words" coefficient |
| $b_7 =$ | −0.1083 | "This Court Phrases" coefficient |
| $b_8 =$ | −0.4989 | "Lower Court Phrases" coefficient |
| $b_9 =$ | 0.0560 | "Defendant Words" coefficient |
| $b_{10} =$ | 0.0409 | "Plaintiff Words" coefficient |
| $b_{11} =$ | 0.3589 | "Legal Phrases" coefficient |

If separate Fact and Discussion training sets are used, the same procedure may be repeated to generate the Discussion coefficients except that the Discussion training set is used instead of the Fact training set.

These coefficients are then saved (FIG. 3 step 304) in the Knowledge Base for use during the Recognition Process 210 (FIGS. 2, 7).

The training process 200 having been described above, the recognition process 210 is now described with reference to FIG. 7.

Briefly, the Recognition Process shown in FIG. 7 categorizes paragraphs of an unknown type as containing either Facts or Discussion. The court opinion section of a case law document is input at step 700, and is partitioned into paragraphs in step 701. In step 702, features are extracted from each paragraph and are associated with the paragraph in a manner consistent with the learning algorithm being used (logistical regression or Naïve Bayes, for example). Each feature-laden paragraph is then used by Text Recognition step 703. The Text Recognition step involves reading information gathered during training from knowledge base 201 (FIG. 2) and uses this information to generate two scores, one each for the Fact and Discussion. In step 704, these scores are then compared to determine the category of the paragraph. Finally, in step 705, the results of the category determination are stored.

The following discussion focuses on details of steps in the exemplary recognition process 210 of FIG. 7.

Figure 8:
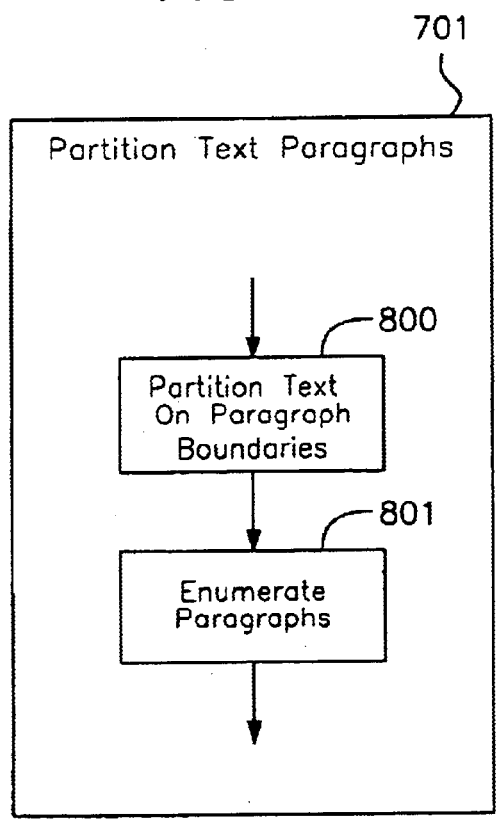
FIG. 8 is a flow chart illustrating details of a step 701 (FIG. 7) of partitioning text into paragraphs.

Referring to FIG. 8, the step 800 of Partitioning Text on Paragraph Boundaries, is used during the recognition process to parse the opinion section of a case law document into individual paragraphs. As it parses the paragraphs, in step 801 they are enumerated (starting at zero), and a total count of paragraphs is kept.

These counts are used by the Extract Features step (702 in FIG. 7) to compute the position of the paragraph in the opinion. Each paragraph is then passed into the Extract Features 702 step. (The step 702 of Extracting Features may be identical to the Extract Features Module 702 detailed with reference to FIG. 5.)

Figure 9:
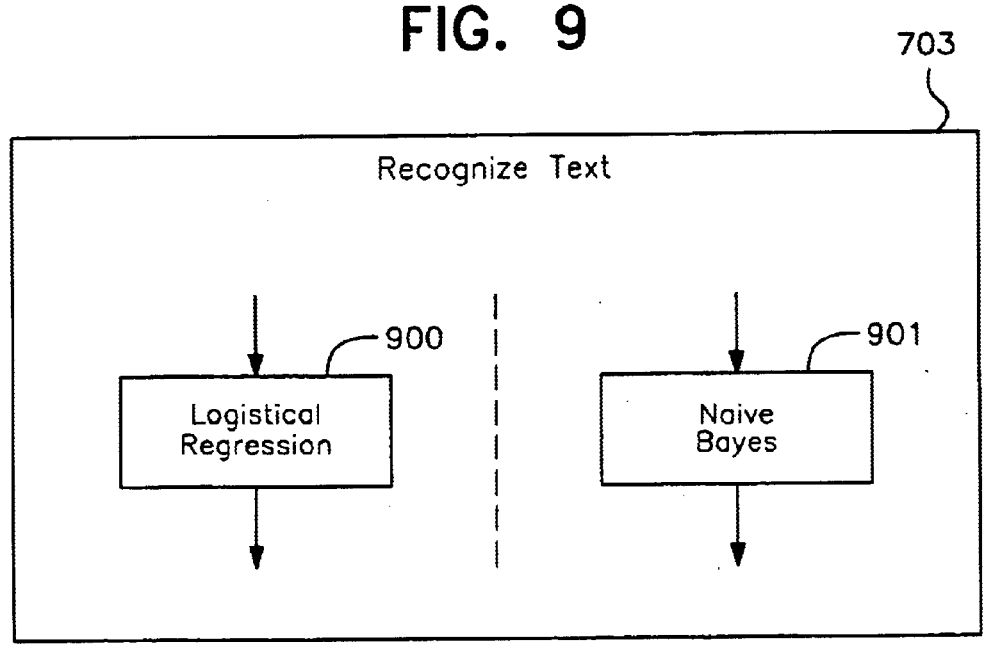
FIG. 9 is a flow chart illustrating alternative, exemplary embodiments of step 703 (FIG. 7) of recognizing fact and legal discussion paragraphs.

The Text Recognition step 703, detailed in FIG. 9, takes the feature-laden paragraphs and uses the knowledge base to compute the probability that the paragraph is Fact or Discussion. This probability is represented by two scores, a Fact score and a Discussion score.

The Fact score represents the probability that the paragraph contains factual terms and features. The Discussion score represents the probability that the paragraph contains legal discussion terms and features. These scores are then passed on to the Compare Scores step 704 (FIG. 7) module to determine if the paragraph is Fact or Discussion.

The Compare Scores step 704 involves comparing the Fact score F and Discussion score D to determine what the category of the paragraph should be. To make a binary decision, these scores can be simply compared to each other. Whichever score is higher determines the category of the paragraph, with one of the categories having precedence if the scores are identical.

As an alternative embodiment of the scoring step, by using a threshold T, the following categorization can also be determined from the Fact score F and the Discussion score D:

1. The paragraph contains FACTS if F>T and D<=T.
2. The paragraph contains DISCUSSION if D>T and F<=T.
3. The paragraph contains BOTH Facts and Discussion if D>T and F>T.
4. The paragraph contains NEITHER Fact nor Discussion if D<=T and F<=T.

When the category of the paragraph has been determined, it can be either presented directly to a user via interface 101 (FIG. 1), or saved in storage 103 for further processing.

Alternative choices of learning algorithm. The invention provides that various schemes may be used in the invention's recognition training and text recognition steps (see FIGS. 6 and 9). The logistical regression method having been described above, the following description relates to the Naïve Bayes method.

This second embodiment utilizes a classification algorithm based on a simple classification technique utilizing Bayes' Theorem to compute the probabilities that a text unit or query is of a given classification, based on the presence and absence of query terms in each classification.

The exemplary Naïve Bayes classifier uses the following equation to estimate the probability of a specific class, $v_j$, given the terms and tokens of a particular text unit $t_m$ (a "text unit" may be, for example, a single paragraph).

$$P(v_j|t_m) = P(v_j) * \Pi P(w_k|v_j)$$

in which:

$v_j$ is a specific class, $P(vj|t_m)$ is the probability of the class $v_j$, given a text unit $t_m$, $P(v_j)$ is the prior probability of class $v_j$, $\Pi P(w_k|v_j)$ is the product of all the probabilities of all terms and/or tokens in the text unit $t_m$, and $w_k$ is a term or token of text unit $t_m$ This equation is derived using Bayes Theorem and assumes that the probability of a term or token is independent of both:

a) where it appears in the text unit and b) the other terms and tokens in the text unit.

This is known as the Naïve assumption.

Given a particular text unit $t_m$, classification is done by selecting the class with the largest estimated probability as determined by the above equation.

The training process 200 (FIGS. 2, 3) is the process of using the terms and tokens of a randomly selected set of text units, as well as each text unit's predefined classification, to calculate and save in the knowledge base the following terms of the is foregoing equation:

a) the class prior probabilities, $P(v_j)$, and b) each $P(w_k|v_j)$, the probability of term or token $w_k$ given we know the classification, $v_j$, of the text unit $w_k$ came from.

The Naïve Bayes classifier is first trained in the same manner as shown in FIG. 3. A plurality of case law documents input at step 300 is parsed in step 301 to extract Fact and Discussion paragraphs from the opinion section. A paragraph is considered Fact if the heading preceding it is one of those in the exemplary list in Appendix A, and is considered Discussion if the heading preceding it is one of those in the exemplary list in Appendix B. Paragraphs following a heading that do not appear in the fact or discussion heading lists are ignored.

The separation of the training data into Fact and Discussion based on the headings within the opinion segment is an important aspect of this embodiment of the invention. It is important for these reasons:

A relatively large sampling of data is necessary to extract terms that best represent the entire collection. The invention allows use of large data samples.

It is very costly to have legal analysts manually classify paragraphs or sections of case law documents as containing Fact or Discussion. The invention avoids this cost.

The invention leverages existing data as classified by the judge who wrote the opinion.

At this point, this embodiment of the classifier has enough information to classify text as either Fact or Discussion, based solely on the terms used within the Fact and Discussion training paragraphs. However, performance of the classifier can be greatly improved by providing additional features used to help it distinguish Fact and Discussion paragraphs. Such features include:

1) Position of the paragraph within the opinion

2) Case cites

3) Statute cites

4) Past-tense verbs

5) Dates

6) Issue words

7) Holding words

8) References to a court

9) References to the defendant

10) References to the plaintiff

11) Legal phrases

For the Naïve Bayes classifier, these features are extracted in step 302, and are appended to the training paragraph as simple terms. For example, for each past tense verb found in the paragraph, the term "_PTV_" is appended.

This is best understood with an example. The following is a Fact paragraph taken from a case law document:

By letter dated Dec. 15, 1975, plaintiff requested of the served defendants, including respondents, a written stipulation extending for six months the five-year deadline for commencement of trial herein from Jun. 21, 1976, in the event the deadline applied. Respondents never granted this request and no written stipulation extending the Jun. 21, 1976, deadline was ever either executed or filed.

From this, features are extracted and appended to the paragraph as additional terms:

"BY LETTER DATED DEC. 15 1975 PLAINTIFF REQUESTED OF THE SERVED DEFENDANTS INCLUDING RESPONDENTS A WRITTEN STIPULATION EXTENDING FOR SIX MONTHS THE FIVE YEAR DEADLINE FOR COMMENCEMENT OF TRIAL HEREIN FROM JUN. 21 1976 IN THE EVENT THE DEADLINE APPLIED RESPONDENTS NEVER GRANTED THIS REQUEST AND NO WRITTEN STIPULATION EXTENDING THE JUN. 21 1976 DEADLINE WAS EVER EITHER EXECUTED OR FILED _POS46_ _PTV_ _DATE_ _PLAINTIFF_ _PTV_ _PTV_ _DEFENDANT_ _DEFENDANT_ _DATE_ _PTV_ _DEFENDANT_ _PTV_ _DATE_ _PTV_ _PTV_"

At step 303, the Naïve Bayes classifier is then fed the feature-laden fact and discussion paragraphs as training data. Its output is saved in a knowledge base 201 in step 304, completing the training process.

Details of a second embodiment of the training process, this time using the Naïve Bayes classifier, are now presented with reference to FIGS. 5 and 6.

In step 500, Extract Paragraph Position, the relative position P of the paragraph is calculated by dividing the paragraphs enumeration E by the total number of paragraphs T found in the opinion. As in the first embodiment, P=E/T.

P is multiplied by 100 and the integer portion is converted to text and inserted into the string "_POSXX_" where XX is the two digit position. For example "_POS00_", "_POS01_" etc. . . . This feature is then appended to the paragraph as an additional term or word of the paragraph.

In step 501, Extract Case Cites, cites to other case law documents are extracted. The term "_CITE_" is appended to the paragraph for each case cited.

In step 502, Extract Statute Cites, cites to state or federal statutes are extracted. The term "_SCITE_" is appended to the paragraph for each statute cited.

In step 503, Extract Past Tense Verbs, each word in the given paragraph is compared to the words in the past tense verb list of (exemplary) Appendix C. Matching words are considered past tense verbs, and the appropriate information added to the paragraph. For each past tense verb found in the paragraph an additional term "_PTV_" is appended to the end of the paragraph.

In step 504, Extract Dates, dates such as "4 Jul. 1999", "November 98", "December 25th" are extracted. For each date found in the paragraph an additional term "\_DATE\_" is appended to the end of the paragraph.

In step 505, Extract Issue Words, each word in the given paragraph is compared to the words in issue word list defined in (exemplary) Appendix D. Matching words are considered issue words, and the appropriate information is added to the paragraph. For each holding word found in the paragraph an additional term "\_ISSUE\_" is appended to the paragraph.

In step 506, Extract This Court Phrases, each word in the, given paragraph is compared to the words in the holding word list (This Court Phrase list) defined in (exemplary) Appendix E. Matching words are considered holding words, and the appropriate information is added to the paragraph. For each holding word found in the paragraph an additional term "\_HOLDING\_" is appended to the paragraph.

In step 507, Extract Lower Court Phrases, phrases that refer to a court such as "the trial court" or "the superior court" are extracted as a feature. The paragraph is searched for "Court" phrases as defined in (exemplary) Appendix F, and the appropriate information added to the paragraph. In the Naïve Bayes approach, for each "Court" phrase found in the paragraph an additional term "\_COURT\_" is appended to the paragraph.

In step 508, Extract Defendant Words, each word in the given paragraph is compared to the words in the defendant word list defined in (exemplary) Appendix G. Matching words are considered as references to the defendant, and the appropriate information is added to the paragraph. For each "defendant" word found in the paragraph an additional term "\_DEFENDANT\_" is appended to the paragraph.

In step 509, Extract Plaintiff Words, each word in the given paragraph is compared to the words in the plaintiff word list defined in (exemplary) Appendix H. Matching words are considered as references to the plaintiff, and the appropriate information is added to the paragraph. For each "plaintiff" word found in the paragraph an additional term "\_PLAINTIFF\_" is appended to the paragraph.

In step 510, Extract Legal Phrases, legal phrases such as "criminal history", "custody dispute", "eminent domain" are extracted as a feature. The paragraph is searched for legal phrases as listed in (exemplary) Appendix I, and the appropriate information added to the paragraph. For each legal phrase found in the paragraph, the phrase is appended to the paragraph by combining the words of the phrase with the "underscore" character. For example, if the paragraph contained the phrases "criminal history" and "custody dispute", then the phrases "CRIMINAL\_HISTORY" and "CUSTODY\_DISPUTE" would be appended to the paragraph.

The Train Learning Algorithm step 303 (FIG. 3) is detailed in FIG. 6, which shows how an algorithm can be trained to recognize fact and discussion classifications. Examples of the Naïve Bayes approach are illustrated in steps 610 and 611.

In step 610, training paragraphs are first grouped by their classification type, and in step 611 are presented as input to the Naïve Bayes algorithm. Grouping may entail creating a directory structure in which a directory is created for each classification type, Fact and Discussion. Then each Fact paragraph is saved under the Fact directory, and each Discussion paragraph is saved under the Discussion directory. The Naïve Bayes classifier step 611 then reads the directory structure to determine what classifications are present and the contents of each directory for training examples.

The Naïve Bayes classifying step 611 is executed to process the training data. Thereafter (in FIG. 3 step 340) the resulting output is saved in the knowledge base for use during the subsequent recognition process. Recognition process 210 is similar to that detailed above, except that features are extracted as terms instead of parameter counts and the Naïve Bayes classifier is used instead of Logistical Regression.

The inventive methods having been described above, the invention also encompasses apparatus (especially programmable computers) for carrying out the methods. Further, the invention encompasses articles of manufacture, specifically, computer-readable memory on which the computer-readable code embodying the methods may be stored, so that, when the code used in conjunction with a computer, the computer can carry out the methods.

A non-limiting, illustrative example of an apparatus that the invention envisions is described above and illustrated in FIG. 1. The apparatus may constitute a computer or other programmable apparatus whose actions are directed by a computer program or other software.

Non-limiting, illustrative articles of manufacture (storage media with executable code) may include the disk memory 103 (FIG. 1), other magnetic disks, optical disks, conventional 3.5-inch, 1.44MB "floppy" diskettes, "ZIP" disks or other magnetic diskettes, magnetic tapes, and the like. Each constitutes a computer readable memory that can be used to direct the computer to function in a particular manner when used by the computer.

Those skilled in the art, given the preceding description of the inventive methods, are readily capable of using knowledge of hardware, of operating systems and software platforms, of programming languages, and of storage media, to make and use apparatus for carrying out the foregoing methods, as well as computer readable memory articles of manufacture that can be used in conjunction with a computer to carry out the inventive methods. Thus, the invention's scope includes not only the methods themselves, but apparatus and articles of manufacture.

Modifications and variations of the above-described embodiments of the present invention are possible, as appreciated by those skilled in the art in light of the above teachings. For example, the particular quantity, ordering and manner of using the various lists in the following Appendices may be varied, while remaining within the scope of the present invention. It is therefore to be understood that, within the scope of the appended claims and their equivalents, the invention may be practiced otherwise than as specifically described.

COPYRIGHT NOTICE: A portion of the disclosure (including all Appendices) of this patent document contains material that is subject to copyright protection. The copyright owner has no objection to the facsimile reproduction by anyone of the patent document or the patent disclosure as it appears in the U.S. Patent and Trademark Office patent file or records, but the copyright owner reserves all other copyright rights whatsoever.

Appendix A

Fact Headings—Headings that precede Fact paragraphs:

Background

Background and Facts

Background and Procedural History

Basic Facts

Basic Facts and Procedural History

Facts

Facts and Arguments

Facts and Background Information

Facts and Procedural Background
Facts and Procedural History
Facts and Procedure
Facts and Proceedings
Facts and Proceedings Below
Factual Background
Factual and Procedural Background
Factual and Procedural History
Factual Background and Procedural History
Nature of the Case
Nature of the Case and Background
Statement of Facts and Proceedings
Underlying Facts
Underlying Facts and Procedural History
Underlying Facts and Proceedings

Appendix B
Legal Discussion Headings—Headings that precede legal discussion paragraphs:
  Discussion
  Rule
  Issues
  Analysis

Appendix C
Past Tense Verb List (Abbreviated list)
  ABASED
  ABASHED
  ABATED
  ABBREVIATED
  ABDICATED
  ABDUCED
  ABDUCTED
  ABETED
  ABHORED
  ABIDED
  ABIRRITATED
  ABJURED
  ABLACTATED
  ABLATED
  ABNEGATED
  ABNORMALISED
  ABNORMALIZED
  ABOLISHED
  ABOLITIONISED
  ABOLITIONIZED
  ABOMINATED
  ABOUGHTED
  ABOUNDED
  ABOUT-SHIPED
  ABRADED
  ABREACTED
  ABRIDGED
  ABROGATED
  ABSCINDED
  ABSCISED
  ABSCONDED
  ABSOLVED
  ABSORBED
  ABSTAINED
  ABSTERGED
  ABUTED
  ABYED
  ABIED

Appendix D
Signal Word List
  ADOPT
  AFFIRM
  CONCLUDE
  DISAGREE
  FIND
  HOLD
  MODIFY
  OVERTURN
  REMAND
  REINSTATE
  REVERSE
  UPHOLD
  VACATE
  ADDRESS
  ADOPTED
  AFFIRMED
  ARGUED
  CONCLUDED
  CONTENDED
  HELD
  HOLDING
  ISSUE
  MODIFIED
  OVERTURNED
  QUESTION
  THE ISSUE
  THE QUESTION
  RAISED
  REMANDED
  RENDERED
  REVERSED
  VACATED
  WHETHER

Appendix E
This Court Phrase List
  THIS COURT
  THIS JUDGE
  WE
  THE SUPREME COURT

Appendix F
Lower Court Phrase List
  THE TRIAL COURT
  THE TRIAL JUDGE
  THE APPELLATE COURT
  THE APPELLATE JUDGE

THE COURT OF APPEAL
THE SAME COURT
THE SUPERIOR COURT

APPENDIX G

Defendant Word List

APLEE
APPELLE
APPELLEE
APPELLEES
APPLICEE
APPLICEES
ASSIGNEE
ASSIGNEES
CAVEATEE
CAVEATEES
CLAIMEE
CLAIMEES
CONDEMNEE
CONDEMNEES
CONTESTEE
CONTESTEES
COUNTERAPPELLEE
COUNTERAPPELLEES
COUNTERCLAIM
COUNTERCLAIMING
COUNTERDEFENDANT
COUNTERDEFENDANTS
COUNTERMOVANT
COUNTERMOVANTS
COUNTERRESPONDENT
COUNTERRESPONDENTS
DEFENDANT
DEFENDANTS
DEMANDEE
DEMANDEES
GARNISHEE
GARNISHEES
INTERVENEE
INTERVENEES
INTERVENING
LIBELLEE
LIBELLEES
LIENEE
LIENEES
MOVEE
MOVEES
ORIGINAL
PETITIONEE
PETITIONEES
REPONDENT
REPONDENTS
RESPONDANT
RESPONDANTS
RESPONDENT
RESPONDENTS
SUBROGEE
SUBROGEES

APPENDIX H

Plaintiff Word List

APELLANT
APELLANTS
APPELANT
APPELANTS
APPELLANT
APPELLANTS
APPELLENT
APPELLENTS
ASSIGNOR
ASSIGNORS
BANKRUPTS
CAVEATOR
CAVEATORS

APPENDIX H-continued

Plaintiff Word List

CAVEATRICES
CAVEATRIX
CLAIMANT
CLAIMANTS
COMPLAINANT
COMPLAINANTS
CONDEMNOR
CONDEMNORS
CONTEMNOR
CONTEMNORS
CONTESTANT
CONTESTANTS
CONTESTOR
CONTESTORS
CORSS
COUNTERAPPELLANT
COUNTERAPPELLANTS
COUNTERCLAIMANT
COUNTERCLAIMANTS
COUNTERCOMPLAINANT
COUNTERCOMPLAINANTS
COUNTERPETITIONER
COUNTERPETITIONERS
COUNTERPLAINTIFF
COUNTERPLAINTIFFS
DEMANDANT
DEMANDANTS
GARNISHER
GARNISHERS
GARNISHOR
GARNISHORS
GUARANTOR
GUARANTORS
INTERPLEADER
INTERPLEADERS
INTERVENER
INTERVENERS
INTERVENOR
INTERVENORS
LIBELANT
LIBELLANT
LIBELLANTS
LIENOR
LIENORS
MOVANT
MOVANTS
OBJECTANT
OBJECTANTS
OBJECTOR
OBJECTORS
OBLIGOR
OBLIGORS
PETITIONER
PETITIONERS
PLAINTIFF
PLAINTIFFS
PROPONENT
PROPONENTS
PROPOUNDER
PROPOUNDERS
PROSECUTORS
PROSECUTRICES
PROSECUTRIX
PROSECUTRIXES
RELATOR
RELATORS
RELATRICES
RELATRIX
RELATRIXES
RESISTER
RESISTERS
RESISTOR
RESISTORS
SUBROGOR

APPENDIX H-continued

Plaintiff Word List

SUBROGORS
SUBSTITUTE
WARRANTOR
WARRANTORS

Appendix I
Legal Phrases (Abbreviated list)
  DAMAGES RECOVERABLE
  DEFENDANT GUILTY
  DEFENDANT JUVENILE_RECORD
  DEFENDANT MOTION
  DEFENDANT RACE
  DEFENDANT REQUEST
  DEFENDANT STATEMENT
  DEFICIENCY DECREE
  DETERRENT PURPOSE
  DISCLAIMER STATUTE
  DISTINCT OFFENSE
  DIVIDED DAMAGE
  DRAIN LAW
  EJUSDEM GENERIS
  EMINENT DOMAIN
  EVIDENCE PRESENTED
  EXISTING PRECEDENT
  FALSE AFFIDAVIT
  FEDERAL ANTITRUST CLAIM
  FEDERAL IMMUNTY
  FELLOW SERVANT
  FINAL JUDGMENT RULE
  GASOLINE TAX
  HARMLESS BEYOND
  HEIGHTENED SCRUTINY
  HOMESTEAD EXEMPTION
  INDEMNITY CONTRACT
  INDICTMENT CHARGING
  INJURY OCCURRED
  INSOLVENT DEBTOR
  INSUFFICIENT FUND
  INSURABLE INTEREST
  INTANGIBLE PROPERTY
  IRREBUTTABLE PRESUMPTION
  JUDICIAL INTERPRETATION
  JUDICIAL NOTICE
  LATE INDORSEMENT
  LEGAL STANDARD

What is claimed is:

1. A method of gathering large quantities of training data from case law documents and of extracting features that are independent of specific machine learning algorithms needed to accurately classify case law text passages as fact passages or as discussion passages, the method comprising:
  a) partitioning text passages within an opinion segment of a case law document by headings contained therein;
  b) comparing the headings in the document:
    1) to fact headings in a fact heading list, said fact headings in said fact heading list representing a specific set of predefined terms and phrases; and
    2) to discussion headings in a discussion heading list, said discussion headings in said discussion heading list representing a specific set of predefined terms and phrases;
  c) filtering from out of the document:
    1) the headings in said document that match at least one of said fact headings and said discussion headings set forth in said fact heading list and said discussion heading list, respectively; and
    2) text passages that are associated with the filtered headings;
  d) categorizing the text passages as fact training data or as discussion training data based on the filtered headings associated with said text passages, and storing the fact training data and the discussion training data on persistent storage;
  e) determining a relative position of the text passages in said opinion segment;
  f) parsing the text passages into text chunks;
  g) comparing the text chunks to predetermined feature entities for possible matched feature entities, said predetermined feature entities including at least five of:
    i) a Case Cite format;
    ii) a Statute Cite format;
    iii) entities in a Past Tense Verb list;
    iv) a Date format;
    v) entities in a Signal Word list;
    vi) entities in a This Court Phrases list;
    vii) entities in a Lower Court Phrases list;
    viii) entities in a Defendant Words list;
    ix) entities in a Plaintiff Words list; and
    x) entities in a Legal Phrases list;
  h) associating the relative position and matched feature entities with the text passages, for use by one of the learning algorithms; and
  i) classifying each of the text passages as at least one of a fact passage or a discussion passage based on the relative position and matched feature entities.

2. The method of claim 1, wherein the associating step includes:
  associating the relative position and matched feature entities with the text passages, for use by a logistical regression learning algorithm.

3. The method of claim 1, wherein the associating step includes:
  associating the relative position and matched feature entities with the text passages, for use by a naive Bayes learning algorithm.

4. The method of claim 1, wherein each of the method steps is performed using computer-readable code.

5. The method of claim 1, wherein each fact heading in said fact heading list used in said step b) of comparing includes at least one word selected from the group consisting of: background, facts, factual, history, procedural, procedure, proceedings, nature, case and underlying.

6. The method of claim 1, wherein each discussion heading in said discussion heading list used in said step b) of comparing includes at least one word selected from the group consisting of: discussion, rule, issues and analysis.

7. The method of claim 1, wherein the step g) of comparing the text chunks to predetermined feature entities for possible matched feature entities includes comparing the text chunks to all ten of said predetermined feature entities listed in step g).

8. An apparatus for gathering large quantities of training data from case law documents and for extracting features that are independent of specific machine learning algorithms needed to accurately classify case law text passages as fact passages or as discussion passages, the apparatus comprising:

a) means for partitioning text passages within an opinion segment of a case law document by headings contained therein;

b) means for comparing the headings in the document:
        1) to fact headings in a fact heading list, said fact headings in said fact heading list representing a specific set of predefined terms and phrases; and
        2) to discussion headings in a discussion heading list, said discussion headings in said discussion heading list representing a specific set of predefined terms and phrases;

c) means for filtering from out of the document:
        1) the headings in said document that match at least one of said fact headings and said discussion headings set forth in said fact heading list and said discussion heading list, respectively;
        2) text passages that are associated with the filtered headings; and d) means for categorizing the text passages as fact training data or as discussion training data based on the filtered headings associated with said text passages, and storing the fact training data and the discussion training data on persistent storage;

e) means for determining a relative position of the text passages in said opinion segment;

f) means for parsing the text passages into text chunks;

g) means for comparing the text chunks to a list of predetermined feature entities for possible matched feature entities, said list of predetermined feature entities including at least five of:
        i) a Case Cite format;
        ii) a Statute Cite format;
        iii) entities in a Past Tense Verb list;
        iv) a Date format;
        v) entities in a Signal Word list;
        vi) entities in a This Court Phrases list;
        vii) entities in a Lower Court Phrases list;
        viii) entities in a Defendant Words list;
        ix) entities in a Plaintiff Words list; and
        x) entities in a Legal Phrases list; and h) means for associating the relative position and matched feature entities with the text passages, for use by one of the learning algorithms to classify each of the text passages as at least one of a fact passage or a discussion passage based on the relative position and matched feature entities.

9. The apparatus of claim 8, wherein the associating means includes:

means for associating the relative position and matched feature entities with the text passages, for use by a logistical regression learning algorithm.

10. The apparatus of claim 8, wherein the associating means includes:

means for associating the relative position and matched feature entities with the text passages, for use by a naive Bayes learning algorithm.

11. The method of claim 8, wherein each of the method steps is performed using computer-readable code.

12. The apparatus of claim 8, wherein each fact heading in said fact heading list includes at least one word selected from the group consisting of: background, facts, factual, history, procedural, procedure, proceedings, nature, case and underlying.

13. The apparatus of claim 8, wherein each discussion heading in said discussion heading list includes at least one word selected from the group consisting of: discussion, rule, issues and analysis.

14. The apparatus of claim 8, wherein said list of predetermined feature entities includes all ten of a Case Cite format, a Statute Cite format, entities in a Past Tense Verb list, a Date format, entities in a Signal Word list, entities in a This Court Phrases list, entities in a Lower Court Phrases list, entities in a Defendant Words list, entities in a Plaintiff Words list, and entities in a Legal Phrases list.

\* \* \* \* \*